United States Patent [19]

Fukuhara et al.

[11] Patent Number: 4,672,611
[45] Date of Patent: Jun. 9, 1987

[54] SERIAL TRANSMISSION LINE MONITORING DEVICE

[75] Inventors: Masanori Fukuhara; Kikuo Kawasaki, both of Kanagawa, Japan

[73] Assignee: Fuji Electric Company Ltd., Kanagawa, Japan

[21] Appl. No.: 725,172

[22] Filed: Apr. 19, 1985

[30] Foreign Application Priority Data

Apr. 20, 1984 [JP] Japan .................................. 59-78686
Apr. 20, 1984 [JP] Japan .................................. 59-78687
Apr. 20, 1984 [JP] Japan .................................. 59-78688
Apr. 20, 1984 [JP] Japan .................................. 59-78689

[51] Int. Cl.⁴ .......................................... G06F 11/00
[52] U.S. Cl. ...................................... 371/59; 371/17
[58] Field of Search ........................ 371/17, 29, 16; 364/200, 900

[56] References Cited

U.S. PATENT DOCUMENTS 3,937,938 2/1976 Matthews ...................... 371/17 X
4,253,183 2/1981 Taylor et al. .................. 371/29 X
4,513,419 4/1985 Small ................................ 371/29
4,592,053 5/1986 Matsuura ......................... 371/29

Primary Examiner—Charles E. Atkinson
Attorney, Agent, or Firm—Sughrue, Mion, Zinn, Macpeak & Seas

[57] ABSTRACT

A serial transmission line monitoring device is disclosed, in which data flowing along a serial transmission line is received and analyzed by setting a protocol or data format of the serial transmission to convert it into a data for display and to display it for a monitoring purpose. The device has a break function for terminating a supply of the display data to an external display unit in response to an occurrence of a specific data. The break function is controlled so that it is possible to display data discriminatively after the occurrence of the specific data to thereby facilitate an analysis of transmission error. The received data or the data for display is supplied to the external display unit and an external memory unit simultaneously to make a display of a data reproduced from the memory unit possible later on.

8 Claims, 17 Drawing Figures

```
P⎵eng⎵* * * * *99                eot  * * * * *60
  S⎵eng⎵* * * * *60                stx⎵0⎵1⎵2
                                 dle⎵0
3⎵4⎵5⎵etx⎵* * * * *10              eot⎵
                                  dle⎵1
* * * * *99
```

| FLAG SEQUENCE | ADDRESS PORTION | CONTROL PORTION | INFORMATION PORTION | FRAME CHECK SEQUENCE | FLAG SEQUENCE |

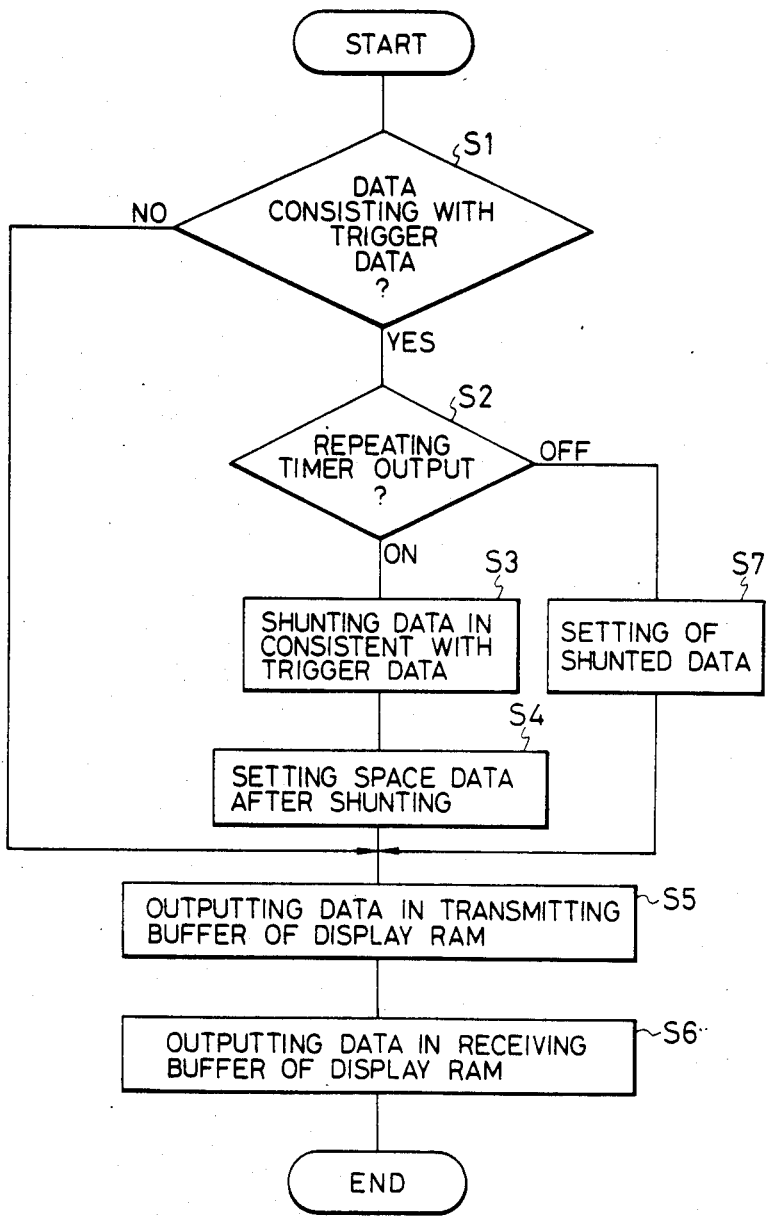

SERIAL TRANSMISSION LINE MONITORING DEVICE

BACKGROUND OF THE INVENTION

This invention relates to a monitoring device for receiving, displaying, and monitoring serial data flowing through a serial transmission line.

In investigating transmission error, prior art monitoring devices make use only of data usually displayed on a display device such as a CRT or a flat panel display. Thus, in investigating transmission error which may occur in devices or systems associated with the serial transmission line (i.e. in operation or in preparation of such devices or systems), it is difficult to clarify error sources since data preceding and/or following the usually displayed data can not be given. If such preceding and/or following data could be displayed in addition to the transmission data portion usually displayed, the analysis of error source would become more reliable.

Modern improvements of transmission protocol has resulted in a trend toward use of complicated transmission sequences. With use of these complicated transmission sequences comes the possibility that error source may initiate in a greater possibility of places within the system: e.g. at the transmitting site, at the receiving site, in mutual data transmission sequences between the transmitting and receiving sites, data transmitted and received under specific conditions, etc. The present invention addresses this problem by making possible the analysis of different transmission sequences via a break function which terminates a data display in response to, an occurrence of a specific data. However, it is still difficult to analyze the transmission sequence with only the addition of a break function.

Since the display unit will not discriminate between data whose break condition is established and data whose break condition is not, it becomes difficult to search for the transmission data whose break condition is established. Furthermore, when a plurality of trigger data whose break conditions are established exist on the display screen, the search becomes more difficult.

Thus it would be advantageous to have the display indicate or distinguish data whose break condition has been established.

In order to further facilitate analysis of a transmission sequence, it would be advantageous to make it possible to display a portion of data following the transmission data in which an error occurs. Further, it would also be advantageous to make a monitoring device where it is possible to have a function for analyzing data, wherein the break condition can be arbitrarily changed based upon the content of the data stored in a memory of the monitoring device.

In analyzing the content of transmission data monitored, it is conventional to display the data in real time on a display device. It may be desirable to record the transmission data by using an inexpensive cassette tape recorder so that it can be reproduced at any later time. This is particularly advantageous when the system and associated devices are to be field-checked and thus it would be impractical to immediately identify an error therein. That is, in such case, it is necessary to not only display the data in real time, but also simultaneously record it by a recording device such as cassette tape recorder. Such recording device should be as compact and easy in handling as possible.

However, it is difficult to record transmission data transmitted at a speed as high as, for example, 19.2K bits/second by using a cassette tape recorder. As a result, the reliability of reproductions from reproduced data may be poor. Again, this is an increasing problem because of a speeding-up of transmission due to a recent substantial improvement in serial transmission methods.

With the increase of data transmission rate, it also becomes difficult to perform simultaneous control of an external display device and data setting with respect to an external memory. In order to realize the simultaneous display and recording with using an inexpensive memory device, it may be possible to store the transmission data temporarily in a random access memory, and then to simultaneously display and record it later by using the content of the memory. This approach, however, requires an increased processing time, causing time delays in supplying display output to a display unit and memory output to a simple memory unit such as cassette tape recorder.

Once a serial data on the serial transmission line is received and then displayed on the display unit such as CRT to monitor it, prior art devices are also disadvantageous in that it is difficult to determine the direction of data displayed, i.e. there are at least two data directions. One being sent from the transmitting side to the receiving side and the other being opposite in direction. In order to determine the data direction one approach would be to display them separately. However, although the mere separate display of the transmitting and the receiving side data may facilitate an analysis of simple transmission conditions, it is still difficult to analyze complicated time serial data transmission conditions (e.g. time from an end of the transmitting side data flow to a start of the receiving side data flow, time delays introduced in these data flows, etc.).

Separate display of transmitting and receiving data also has a further disadvantage. When display and monitoring is made of the transmitting data only, the display screen area for receiving data remains empty. The opposite is true when display and monitoring is made of the receiving data only. Thus, an approach using separate display of transmitting and receiving data is inefficient as to use of display screen area.

A further disadvantage of the prior art is observed in the monitoring of data in a semi-duplex system. In display of data transmission in a semi-duplex system, it is usual to display only transmitting and receiving side data in which protocol such as flags, characters, etc. have been removed. This removal before display makes it impossible to analyze possible errors in protocol in the semi-duplex transmission system. Thus it would be advantageous to be able to display these protocol to facilitate analysis.

SUMMARY OF THE INVENTION

An object of the present invention is to provide a serial transmission line monitoring device in which: a specific data, to be detected i.e., trigger data, can be set with respect to a serial data from either a transmitting side or a receiving side, a break condition under which a data dislay is terminated can be set in response to a detection of the trigger data; and, the serial data which occurs after the data break condition is established can be selectively displayed.

Another object of the present invention is to provide a serial transmission line monitoring device which receives and displays a transmission data occurring on the serial transmission line, and which can simultaneously record it in a simple memory device such as a cassette tape recorder to allow display of the reproduced transmission data at a later time.

A further object of the present invention is to provide a monitoring displaying system for the serial transmission line in which, data from the transmitting side and from the receiving side are either distinguishably or individually displayed, and transmission conditions such as time length of data interruption and establishment of break condition can be clearly displayed.

BRIEF DESCRIPTION OF THE DRAWINGS

FIG. 17 is a flow-chart showing a process of a display data output.

DETAILED DESCRIPTION OF THE PREFERRED EMBODIMENTS

Figure 1:
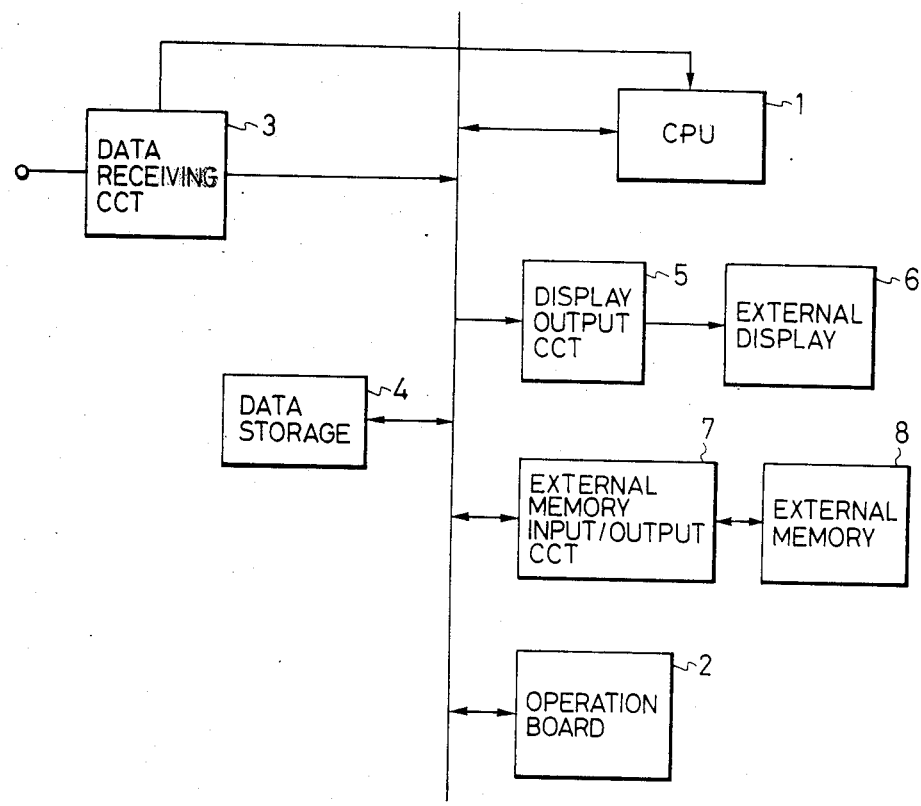
FIG. 1 is a block circuit diagram of an embodiment of the serial transmission line monitoring device according to the present invention.

FIG. 1 shows an embodiment of the present invention. A transmission data is stored in a random across memory (RAM) data storage unit 4, via a data receiving circuit 3. This storing of the transmission data occurs under a control of a central processing unit (CPU) 1. The CPU 1 reads out the data from the data storage unit 4, processes it according to an instruction content set input via the operation of keys on an operation board 2. The CPU 1 then transfers a result of the processed data to a display output circuit 5 and an external memory input/output circuit 7. The transferred data is outputted to an external display unit 6 such as CRT, and an external memory unit 8 such as cassette tape recorder. The external display unit 6 may also be a liquid crystal display housed in the monitor device.

Figure 2:
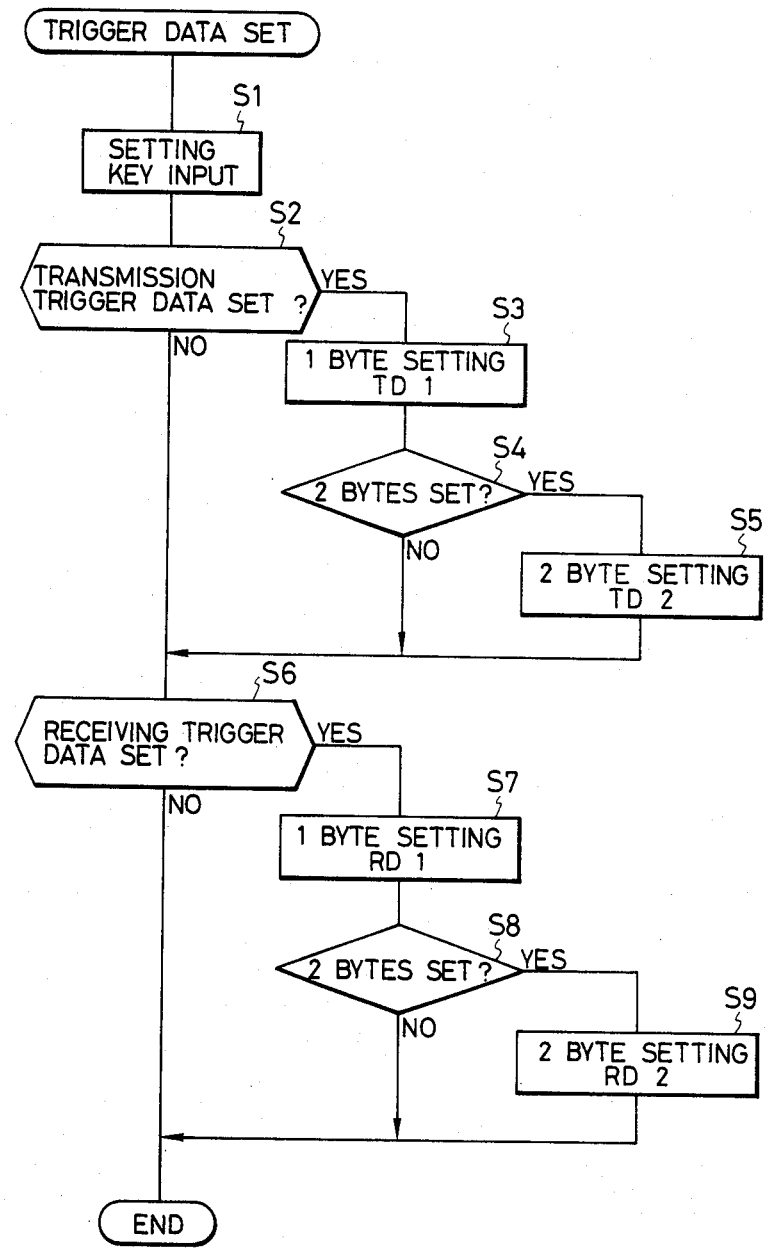
FIG. 2 is a flow-chart showing a process of break condition setting of the monitor device.

FIG. 2 is a flow-chart of a process for adding a trigger data for a detection of a specific transmission data, which is to be performed in the monitor device constructed as above. In this embodiment, a maximum of 2 data can be set for each of the transmitting side and the receiving side.

In FIG. 2, an input content which is given by function setting switch operations on the operation board 2 is read in as step S1, and then in step S2 it is determined whether or not a trigger data setting is required in the transmitting side. If affirmative, the process is shifted to a step S3 in which a TD1 of 1 byte is set in the memory. Then, in a step 4, it is determined whether or not a setting of 2 bytes is necessary, and if yes the process is shifted to a step 5 in which a TD2 of 2 bytes is set in the memory.

Then, the process, including the negative responses flowing from steps S2 and S4, is shifted to a step S6 in which it is determined whether or not a trigger data setting in the receiving side is necessary. This determination is made in a manner similar to the above. When affirmative, the process is shifted to a step S7 in which a RD1 of 1 byte is set in the memory. Then, in a step S8, it is determined whether or not a setting of 2 bytes is necessary; when affirmative, the process is shifted to a step S9 in which a RD2 of 2 bytes is set in the memory.

Since, in the above process, the number of trigger data is selectable individually for the transmitting side and the receiving side, it is possible to set 2 bytes of the transmission trigger data and 1 byte of the receiving trigger data, or vice versa. Therefore, it is possible to set the break function under various break conditions, making a wide variety of data analysis possible.

In the present monitor device, the following break conditions are considered, and any one of them can be set preliminarily by the key operation on the operation board 2:

1. A trigger data set in the transmitting side;
2. A trigger data set in the receiving side;
3. A trigger data set in the transmitting side, and thereafter a trigger data set in the receiving side;
4. A trigger data set in the receiving side, and thereafter, a trigger data set in the transmitting side;
5. A trigger data set in either side.

With reference to the flowcharts in FIGS. 3, 4 and 5, respectively, routine and subroutines concerning: a determination of establishment of break condition in the monitoring period; a data display period after the break condition is established; and, a determination of the display period, will be described. In these flowcharts, the routine described can be used to effect any of the cases enumerated above; i.e. a case in which the break condition is established in both the transmitting side and the receiving side independently which corresponds to a combination of the cases itemized as 1 and 2 above, a case in which it is established when a transmission data in the receiving side becomes inconsistent with a trigger data in the receiving side after a transmission data in the transmitting side becomes inconsistent with a trigger data in the transmitting side which corresponds to the case itemized as 3 above, and a case in which it is established when a transmission data in the transmitting side becomes in consistent with a trigger data in the transmitting side after a transmission data in the receiving side becomes in consistent with a trigger data in the receiving side, which corresponds to the case itemized as 4 above.

Figure 3:
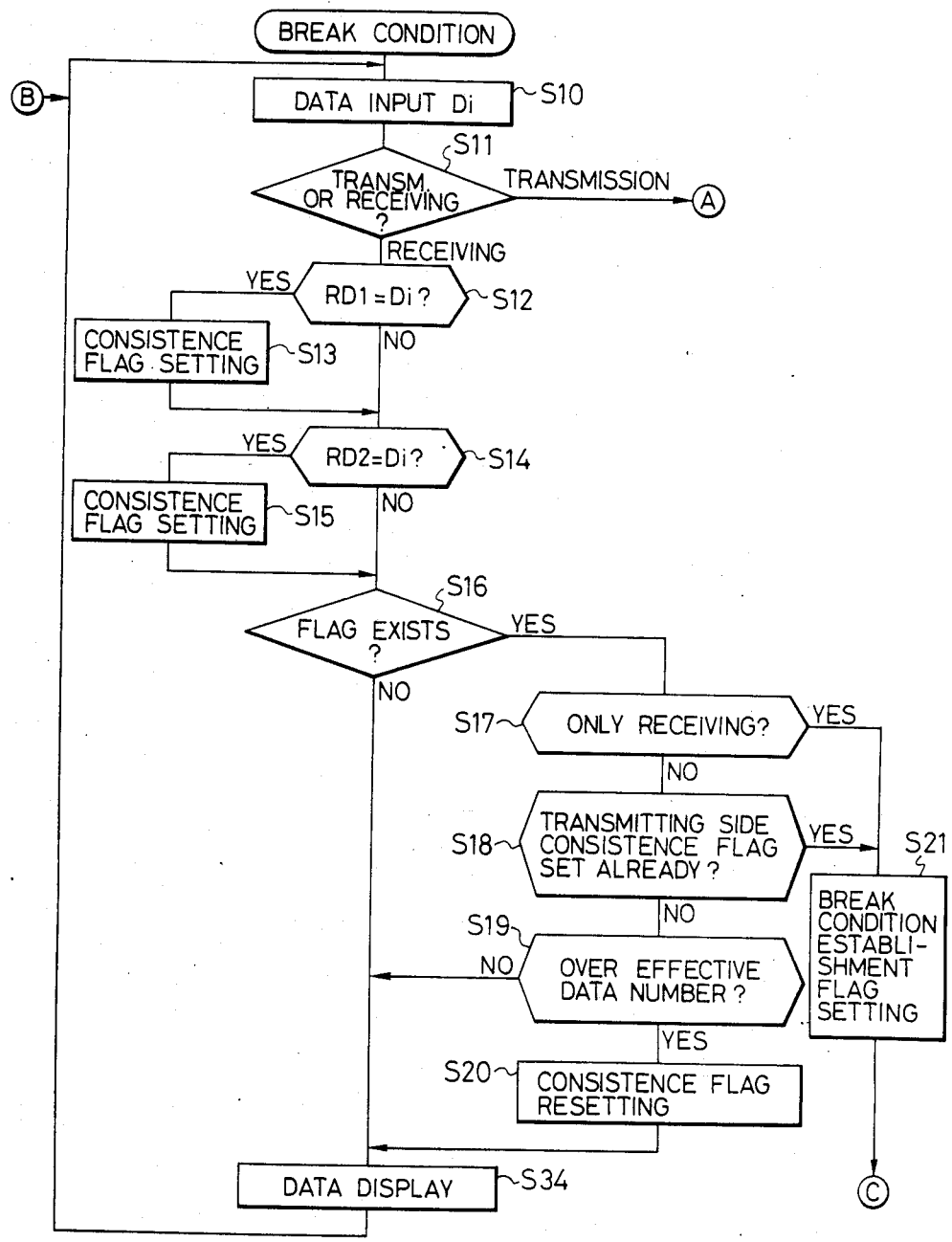
FIG. 3 is a flow-chart showing a process of determining whether the break condition is established during a monitoring time.

In the flow-chart shown in FIG. 3, an input data Di received from the transmission line is taken-in a step S10, and then it is determined in a step S11 whether the input data Di is that in the transmitting side or the receiving side. When the input data Di is in the receiving side, the routine is shifted to a step S12 in which the input data Di is compared with a trigger data RD1 in the receiving side. When the comparison shows consistency between Di and RD1, a consistence flag is set in step S13. After either (1) the consistence flag is set in step S13, or (2) no consistence is shown in the comparison of steps S12, the routine is then shifted to a step S14.

In the step S14, the input data Di is compared with a trigger data R2 in the receiving side and, when consistency is shown, a consistence flag is set in a step S15. After either (1) the consistence flag is set in step S15, or, (2) no consistency is shown in the comparison of step S14, the routine is then shifted to a step S16.

In the step S16, it is determined whether or not the consistence flag is set, and, if not, the routine is shifted to a step S34 in which a display of the transmission data is performed. If, the other hand, it is determined that the consistence flag is set, the routine is shifted to a step S17. Here it is determined whether or not the break condition is set in only the receiving side. If yes, the routine is shifted to a step S21 in which a break condition establishment flag is set. If, on the other hand it is determined that the break condition has not been set in only the receiving side, the routine is shifted to a step S18 in which it is determined whether or not a consistence flag is set in the receiving side after the flag in the transmission side is set. If yes (note that this corresponds to the break condition specified in case 1) above), the routine is shifted to a step S21 in which a break condition establishment flag is set. If the other hand it is determined that the consistence flag in the receiving side is not set after the flag in the transmission side is set, the routine it is shifted to a step S19 in which it is determined whether or not the number of data exceeds the number of effective data. If yes, the routine is shifted to the step S20 in which the consistent flag is set. From step S20, the routine is shifted to the step S34 in which a data display is performed. If the answer to the determination in step S19 had been no, the routine would have been shifted directly to the step S34. After the data display is performed in step S34, the routine returns to the step S10 and repeats the above mentioned processes until a break condition is established.

If the input data Di taken in the step S10 is a transmission data, the establishment of a break condition is determined through a similar routine to those mentioned above with respect to the trigger data TD2 which is set according to the flow-chart shown in FIG. 2. This routine will be shown and described using FIG. 4.

Figure 4:
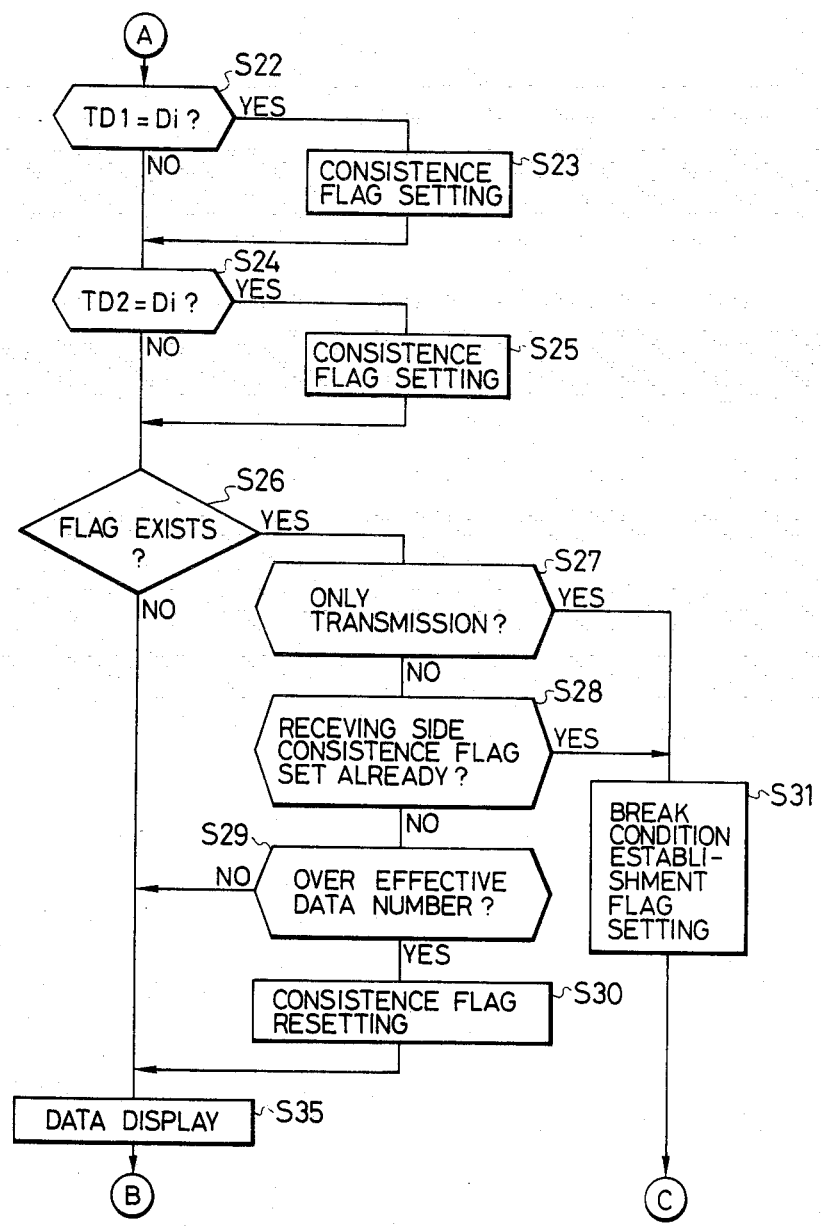
FIG. 4 is a flow-chart showing a subroutine of a portion of the break condition determining process.

As a comparison of FIG. 4 with that in FIG. 3, will show steps S22 to S31 in FIG. 4 correspond to the steps S12 to S21 in FIG. 3 except that the trigger data to be processed are TD1 and TD2 in the transmission side in FIG. 4.

Figure 5:
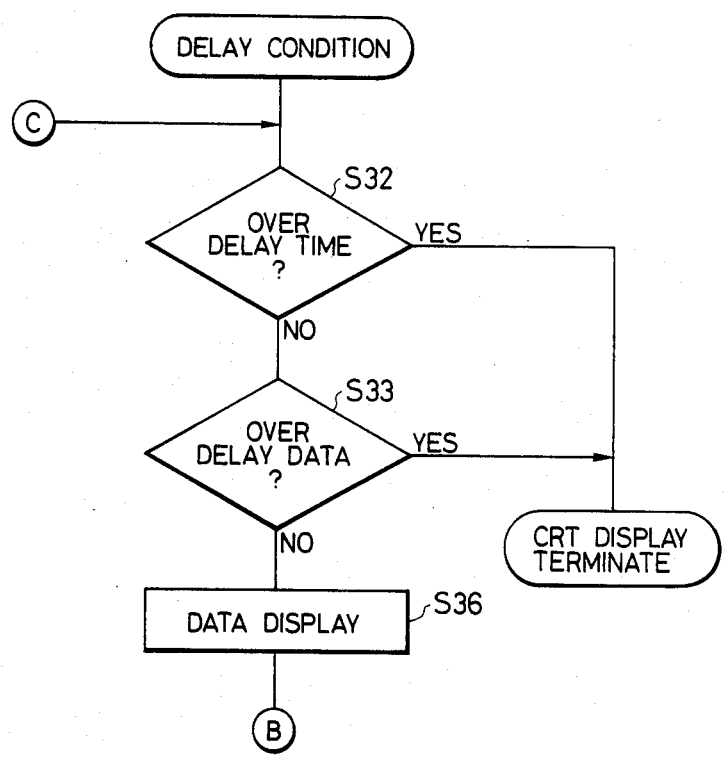
FIG. 5 is a flow-chart showing a process of determining an establishment of display condition thereof.

When the break condition establishment flag is set upon the establishment of the case 1 in the step S21 of the flow-chart in FIG. 3 or of the case in the step S31 of the flow-chart in FIG. 4, the routine is shifted to the subroutine in FIG. 5. This subroutine in FIG. 5 is for setting a display condition for an interruption of the data transmission. In the flow-chart in FIG. 5, it is determined in a step S32 whether or not the display time becomes excessive. If not excessive, the subroutine goes to a step S33 in which it is determined whether or not a display data becomes excessive. If the determination made in the step S33 is negative, the subroutine goes to a step S36 in which a display of the transmission data is performed. Then, the processes according to the flow-chart in FIG. 2 is repeated until another break condition is established. When the determinations made in the step S32 and S33 are affirmative, the display of the transmission data is terminated.

It should be noted that in the present monitor device, the input data Di is displayed on the external display unit 6 according to the steps S34 and S35 and simultaneously stored in the data storage unit 4, during the monitoring thereof.

Figure 6:
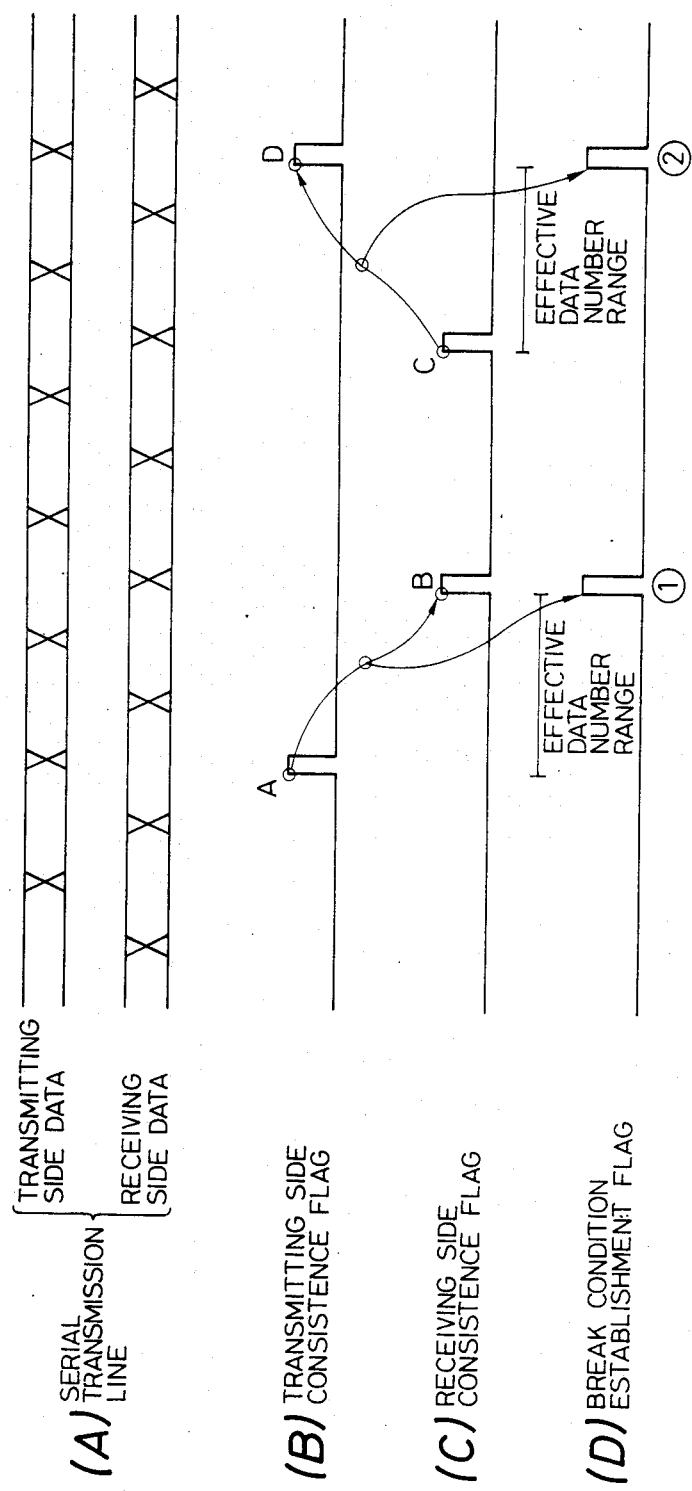
FIG. 6 are diagrams showing the timing of establishment of break conditions thereof.

Timings of the break condition establishment in the case 1 and the case 2 are shown in FIGS. 6A to 6D. When the transmission side data and the receiving side data flow alternatively through the serial transmission line as shown in FIG. 6A, the break condition of the case 1 is established if the consistent flag B in the receiving side is set within a effective range of the number of data as shown in FIG. 6D after the consistent flag A in the transmission side is set as shown in FIG. 6B. Similarly, the break condition of the case 2 is established if a consistent flag D in the transmission side is set in an effective range of the member of data as shown in FIG. 6D after the consistent flag C in the receiving side is set as shown in FIG. 6C.

As described previously, a trigger data of 2 bytes can be set in the transmission side and the receiving side, respectively. Therefore, when the break conditions of the cases 1 and 2 are set, it is possible to treat the serial transmission system using complicated protocol and thus the analysis of transmission error and/or the system development can be made very effectively.

It should be noted at this time that after the break condition flags are set in the steps S21 and S31 in the flow charts in FIGS. 3 and 4, the delay condition is judged according to the flow-chart in FIG. 5. Furthermore, the delay conditions (i.e., delay time and effective member of data) are set preliminarily by a key operation of the operation board 2. Thereafter the time from the establishment of the break condition and the member of data are compared for every input data. When either the time or the number of data becomes excessive, the data can be displayed, even after the establishment of the break condition as mentioned previously.

Therefore, when any device associated with the serial transmission line or the system itself malfunctions immediately after the transmission data is outputted, a trace and analysis of the malfunction is facilitated.

Although the previous description was made as to the monitoring of received input data, it should be noted that with the present invention it is possible to readout and monitor data stored in the data storage unit 4. In such a case, a trigger data, a break condition, and a delay condition are preliminarily set by key operations of the operation board 2, and then the data is readout from the data storage unit 4. The data is processed as the data Di in the step S10 in FIG. 3, and also further processed according to the flow charts in FIGS. 3 to 5. In this case, however, the data displayed by the external display unit 5 is not written in the data storage unit 6. Using this approach, numerous determinations as to trigger data and break condition are made for the data stored in the data storage unit 4 by checking the stored data with various trigger data and break conditions. Therefore, the confirmation of the protocol, etc. can be performed effectively by repeatedly making determinations of coincidence between the trigger data and the break condition for the same stored data.

Figure 7:
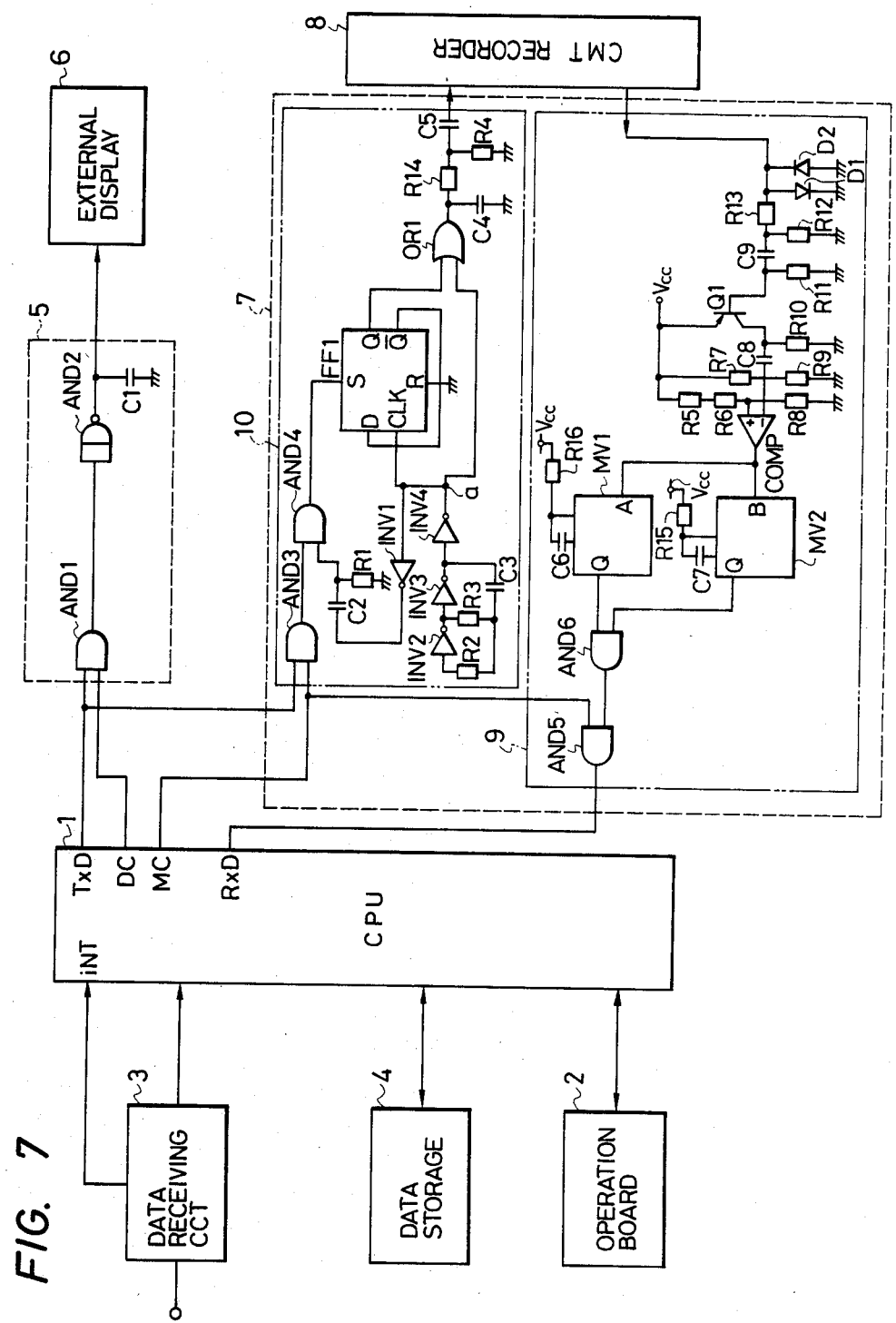
FIG. 7 is a block circuit diagram showing a portion of the present serial transmission line monitor device in detail.

FIG. 7 shows a detailed construction of the present monitor device shown in FIG. 1, i.e., a monitor device for outputting the received data or data for display to the external display unit and simultaneously, outputting this data to the external memory unit. The monitor device shown in FIG. 7 can also be used for reproducing the data from the external memory unit to have the data displayed it by the external display unit.

In FIG. 7, the display output unit 5 and the external memory input/output circuit 7 of the construction shown in FIG. 1 are shown in detail. The display output circuit 5 is composed of AND gates AND1 and AND2 and a capacitor C1. The external memory input/output circuit 7 is composed of an external memory input circuit 9 and an external memory output circuit 10. The external memory input circuit 9 is composed of monostable multivibrators MV1 and MV2, AND gates AND5 and AND6, a comparator COMP, a transistor Q1, diodes D1 and D2, resisters R5 to R13, R15 and R16 and capacitors C6 to C9. The external memory output circuit 10 is composed of a flip-flop FF1, AND gates AND3 and AND4, an OR gate OR1, inverters INV1 to INV4, resister R1 to R4 and R14 and capacitors C2 to C5.

A data display on the external display unit 6 is performed by making a DC terminal of the CPU1 to logical high level "1" to open the gate AND1 of the display output circuit 5 so that the data can pass through the gates AND1 and AND2 to the display unit 6. With the system shown in FIG. 7, a frequency shift keying (FSK) system can also be used to record the data in the cassette tape recorder 8. When the data from a TXD terminal of the CPU is at a logically high level, the data is sent to the cassette tape recorder 8 at a frequency existing at a point a in the external memory output circuit 10. When it is at a low level, the data is sent to the cassette tape recorder 8 at a frequency which is a half the frequency at the point a.

As to a reproduction of the data from the cassette tape recorder 8, a signal waveform of the reproduced data is shaped by a waveform shaping circuit including the transistor Q1 in the external memory input circuit 9 of the external memory input/output circuit 7. The monostable multivibrators MV1 and MV2 are operated in response to the shaped waveform to make the waveform restored to that before the frequency shift keying. The restored data is sent through the gates AND5 and AND6 to a $R_xD$ terminal of the CPU1. The CPU1 supplies the data received at its $R_xD$ terminal to the external display unit 6 through the $T_xD$ terminal and simultaneously to the data storage unit 4.

Figure 8:
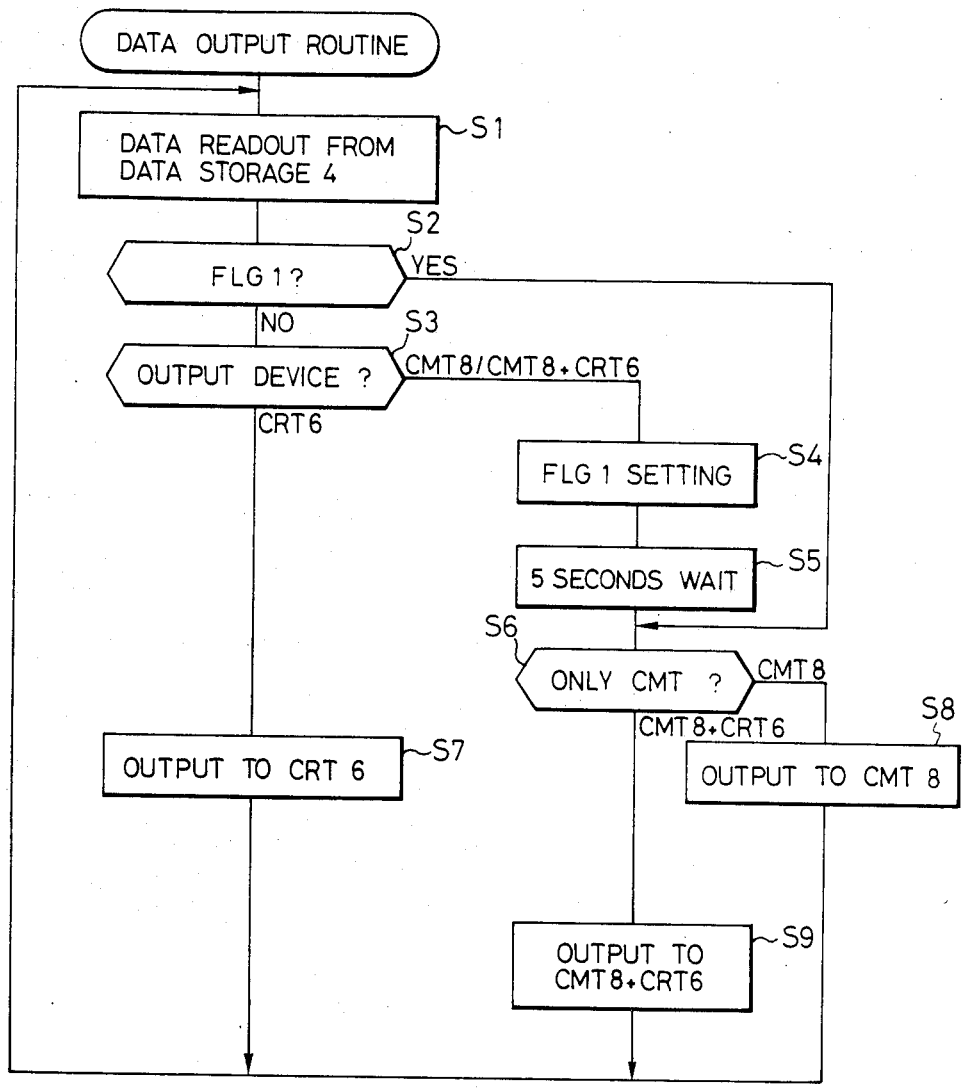
FIG. 8 is a flow-chart showing a process of outputting a processed data to a display output circuit and an external memory input/output circuit.

FIG. 8 is a flow-chart for providing the processed data to the display output circuit 5 and the external memory input/output circuit 7.

In FIG. 8, a stored data in the data storage circuit 4 comprising, for example, a random access memory (RAM), is readout in a step S1. Then in a step S2, it is determined by checking a flag 1 to see whether or not it is an initial stage of a data output when the data is outputted to the cassette tape recorder 8. When the flag 1 is set, the routine is shifted to a step S6 and, when the flag 1 is not set, to a step S3. In the step S3 it is determined whether or not the cassette tape recorder 8 is included in the external unit to which the data is to be supplied, or whether the external unit includes only the external display unit 6. When the data is to be supplied to only the external display unit 6, the routine is shifted to a step S7 in which the data is supplied to the display unit 6.

When the external unit includes the cassette tape recorder 8, the routine is shifted from step S3 to a step S4 to set the flag 1. The routine is then to a step S5 to wait the data output for 5 records. Therefore, when an initial data output is supplied to the cassette tape recorder 8, the recorder 8 is not set to a recording state yet and, therefore, an erroneous data output is prevented from being supplied to a leader portion of a magnetic tape. Then, in a step S6, it is determined whether or not the data is supplied to only the cassette tape recorder 8 and, when affirmative, the routine is shifted to a step S8 to supply the data to the recorder 8. On the other hand, when the data is to be supplied to both the recorder 8 and the external display unit 8, the routine is shifted to a step S9 in which it is done. In either case, the routine is returned to the step S1 upon a completion of the data output to wait for a next data output.

Figure 9:
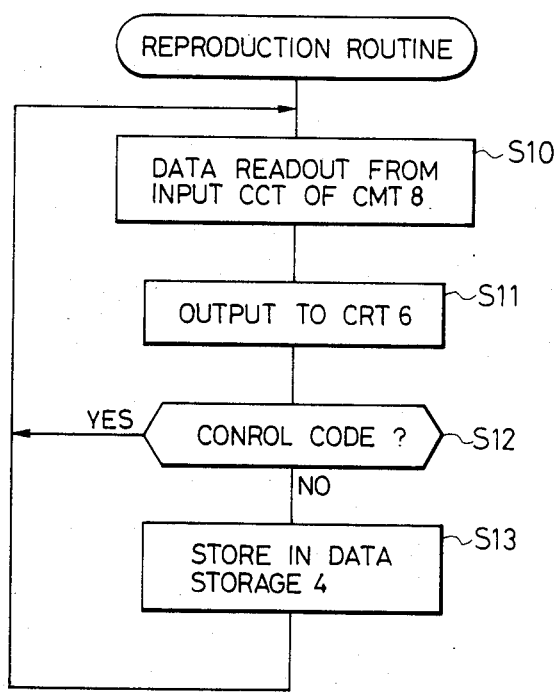
FIG. 9 is a flow-chart for reproducing a stored data from an external memory device.

FIG. 9 shows a flow-chart for reproducing the stored data from the cassette tape recorder 8. In FIG. 9, the data is readout from the input/output circuit 7 connected to the recorder in a step S10. Then, in a step S11, the data readout is supplied to the external display unit 6. That is, since the format of the data to be recorded by the recorder 8 is the same as that of the data to be outputted to the external display unit 6, the data readout from the recorder 8 can be supplied directly to the external display unit 6. Then, in a step S12, it is determined whether or not the data readout from the recorder 8 and supplied to the external display unit 6 is a control code for controlling the data display of the external display unit. When affirmative, the routine is returned to the step S10 without storing the data in the data storage unit 4 to wait for a next reading data. When the data is not the control code but an information code, the readout data is stored in the data storage unit 4 in a step S13, and then the routine is returned to the step S10 to wait for a next process.

By reading out the data from the cassette tape recorder 8 as above, it becomes possible to store the reproduced data whose format is the same as that of the received data outputted in real time in the data storage unit 4. Therefore, with the reproduced data from the cassette tape recorder 8 or the real time input data from the data receiving circuit 3, subsequent handling of the data stored in the data storage unit 4 can be done in the same processes and thus it is possible to reduce the capacity of control program.

When the FSK system is used with the external memory input/output circuit 7, it is possible to easily record and reproduce the serial transmission data by using a commercially available compact cassette tape recorder.

Figures 10, 11:
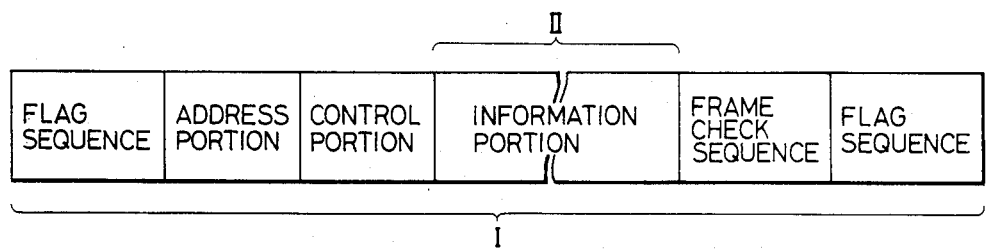
FIG. 10 is an example of a monitor display of the present monitor device.
FIG. 11 is an example of control sequence of the monitor display.

FIG. 10 shows an example of data display of a received serial data on the external display unit of the present serial transmission line monitoring device. In FIG. 10, "*****99" means a 99 ms of data transmission interruption time, i.e., that it takes 99 ms from a sending out of a data "Peng" from the transmission side to a sending out of a data "e o t" from the receiving side. In detail, each symbol "*" represents a unit interruption time of, for example, 3 ms. In this display, the maximum member of the asterisk marks is five, i.e., 15 ms and a total interruption time is displayed by numerical value so that it can be displayed the interruption time clearly with a limited display space. Therefore, the amount of data display can be increased and the interruption can be known intuitively. With this display of the interruption time length, a time serial understanding of the communication content between the transmission side and the receiving side is facilitated and this it is possible to know, exactly, the software and the operation of hardware of the system equipment of this serial transmission line.

Further, when the operation board 2 is operated such that only data is either the transmission side or the receiving side is displayed, it is possible to display a larger amount of data in the selected side. For example, when the capacity of the display plane is 24 character×80 lines=1920 characters and data in the both sides are to be displayed, the amount of data in each side is 960 characters. For one side display, 1920 characters can be displayed, making the data analysis easy. This is effective, particularly in a case where the display capacitor is not enough to display one full mutual communication data at one time. In such one side data display, the mutual communication data (i.e., data in the both sides) are stored in the data storage unit so that they can be arbitrarily readout and displayed.

As to the display of data for which a break condition is established, a display control signal which may provide a flashing display or reverse display is supplied to the external display unit 6 prior to a data supply thereto so that the same data can be displayed in same fashion other than that for displaying usual data. As a result, it becomes possible to distinguish the data whose break condition is established, causing a data search and analysis to be facilitated. For example, in the display shown in FIG. 10, when the data "d l e l" in the receiving side is in consistent with a trigger data, data display is interrupted, and subsequent to a display of the data "e o t" in the receiving side, the data "d l e l" is displayed glitteringly.

The present invention is also useful when the data transmission is conducted in a semi-duplex manner. In this regard, it may be possible to selectively perform a display of only transmission data and of data including the protocol. This is accomplished by the function setting switch on the operation board 2 of the monitoring device. Thus, the display is controlled in such a way as shown in FIG. 11.

In preparing operation of a semi-duplex transmission system and devices associated therewith, the transmission error tends to occur in the protocol rather than the data transmission. Therefore, it is advisable to display a data I including the protocol in such time period so that the content of transmission error is visually confirmed as to whether it is due to flag sequence, address inconsistency, malfunction of the control portion or frame check. In the usual communication stage of a semi-duplex system the data transmission itself usually becomes a source of error, and thus the present invention allows the advantage of having only the information data portion II in FIG. 11 displayed. With the above disclosed display system, the efficiency of monitor display is much improved.

Figure 12:
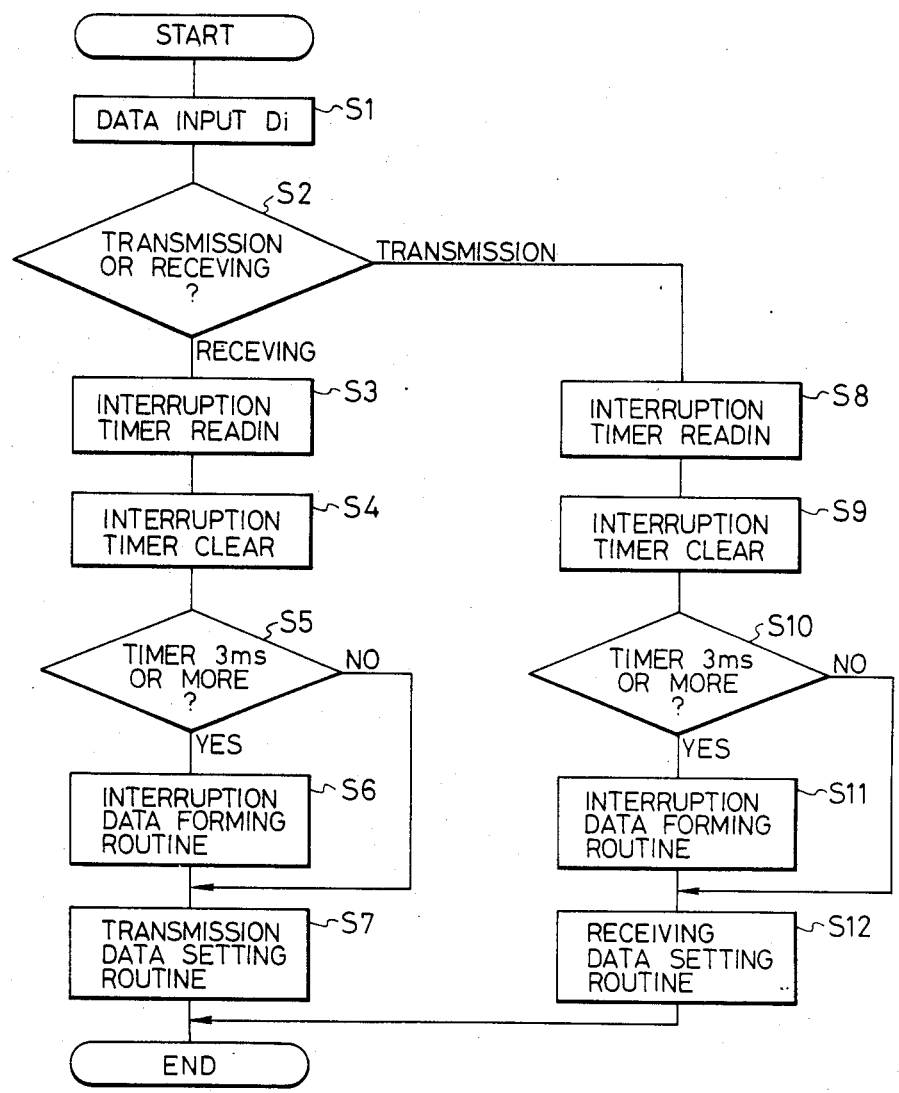
FIG. 12 is a flow-chart showing a process of determining an interruption data.

FIG. 12 is a flow chart of the determination of data interruption, which is performed in the step S10 of the flow-chart in FIG. 3. In FIG. 12, when a data Di is inputted in a step S1, it is determined in a step S2 whether or not the data Di is the transmission data or receiving data, upon which it is shifted to a step 3 or step 8, respectively.

In the step S3, a value of an interruption timer is read-in. The interruption timer is an internal timer of the CPU1 and starts its counting upon a termination of preceding data input. Therefore, the value read-in in the step S3 becomes the interruption time. Then, in a step S4, the timer is cleared for a next counting of an interruption time. Then, in a step S5, it is determined whether or not the interruption time read-in is the step S3 is equal to or layer than 3 ms. When it is shorter than 3 ms, no interruption time display is provided and it is shifted to a transmission data setting routine in a step S7. When it is equal to or longer than 3 ms, it is shifted to a step S6 in which an interruption data is prepared. A flow-chart of an operation to be performed in the step S6 is shown in FIG. 13.

Figure 13:
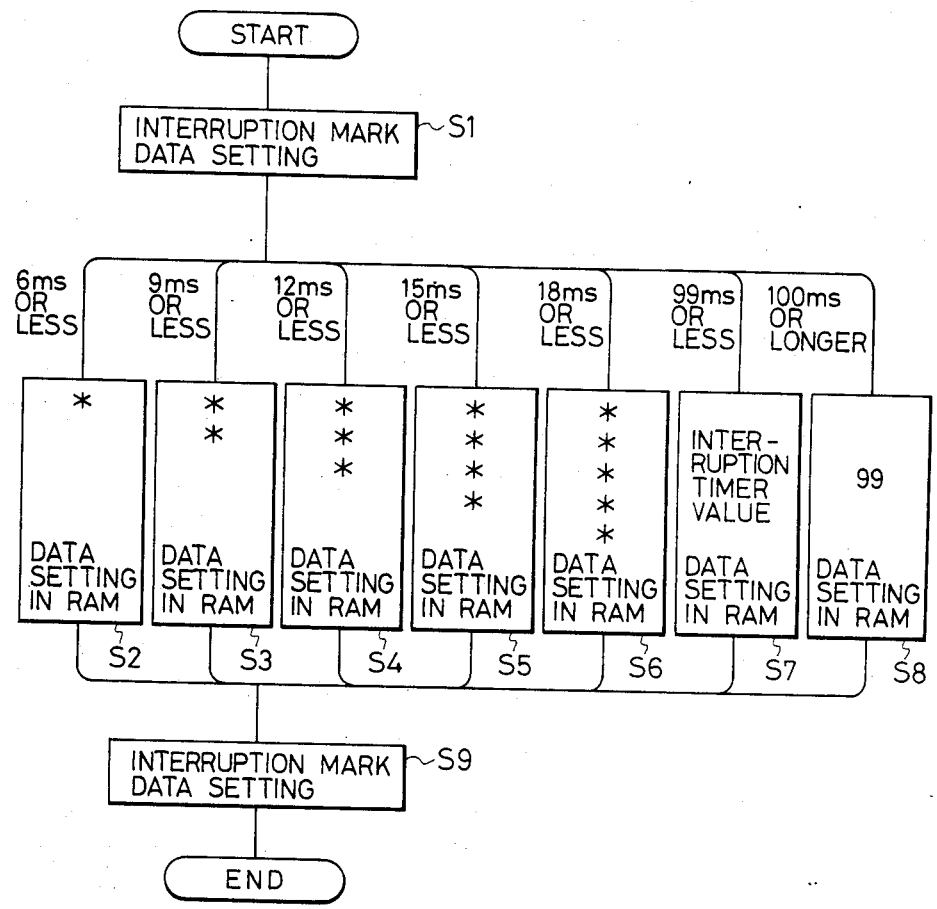
FIG. 13 is a flow-chart showing a process of an interruption data formation.

In FIG. 13, when an interruption mark which shows a commencement of interruption is set in the transmission data RAM of the data storage unit 4 in a step S1, it is determined in step S2 to S8 whether or not the interruption time read-in is equal to or shorter than 6 ms, 9 ms, 12 ms, 15 ms, 18 ms, 99 ms and 100 ms, respectively. When the determinations made in the steps S2 to S8 are affirmative, the asterisk marks (*) are set in the transmission data RAM, one, 2, 3, 4 and 5 in number in the step S2 to S6, respectively. When the interruption timer value is larger than 18 ms and smaller than 99 ms, the value is set in the transmission data RAM in the step S7 and when the timer value is equal to or larger than 100 ms, a value 99 is set in the RAM in the step S8. Then in a step S9, the interruption mark is set in the RAM again for an indication of termination of the interruption. Thus, the interruption data is prepared for display.

Figure 14:
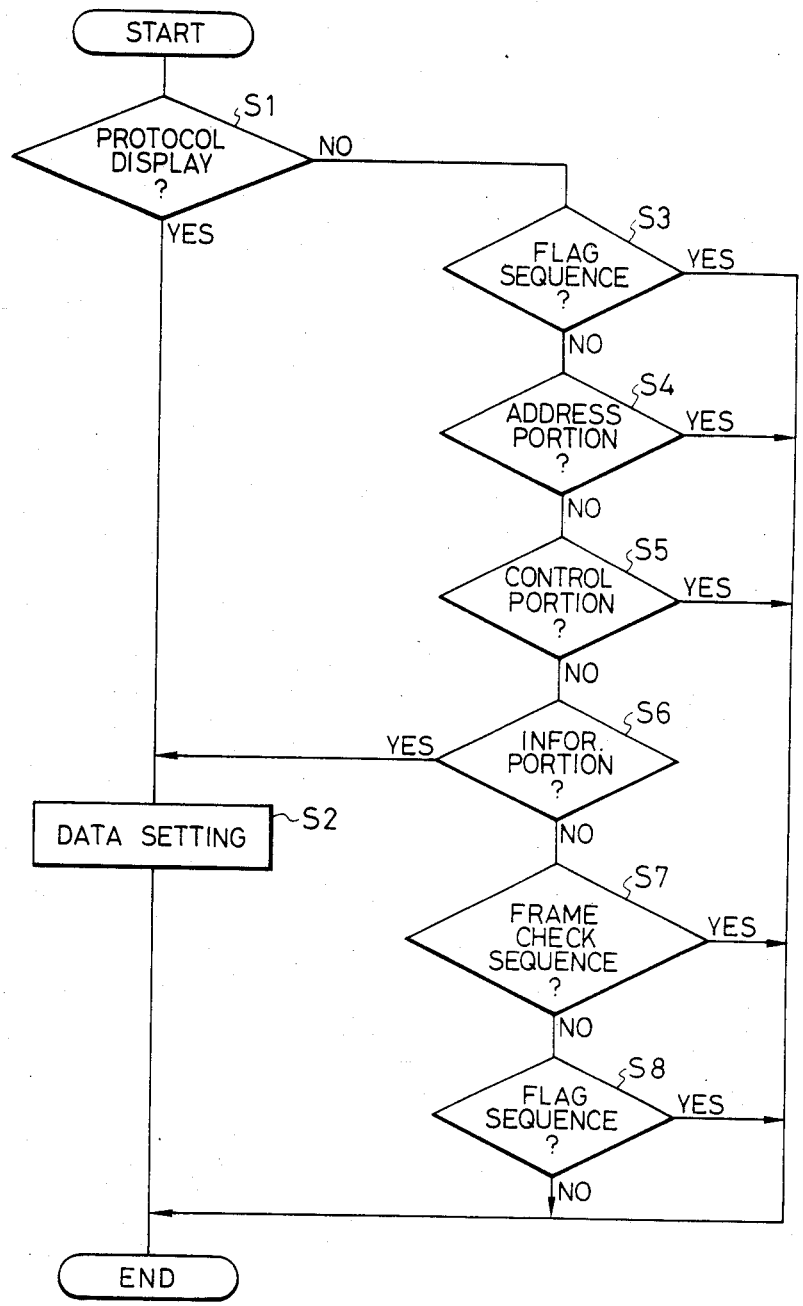
FIG. 14 is a flow-chart showing a process of transmission data setting.

When such interruption data preparing routine is completed, it is shifted to a step 7 in FIG. 12, the transmission data setting routine to be performed in the step S7 in FIG. 12 is shown in FIG. 14.

In the present monitor, the display is selective between only the transmission data and data including the protocol by means of operation of the function setting switch on the operation board 2. This is determined in a step S1 in FIG. 14 which is the display desired. When the display should include the protocol, the data is set in the transmission data RAM as it is, in the step S2. When only the transmission data is to be displayed, it is shifted through steps S3 to S8 for selecting only the information portion of the data and setting it in the transmission data RAM. Thus the processing of the transmission data is completed.

For the receiving data, similar processes are performed in the steps S8 to S12 in FIG. 12 and the receiving data and an interruption data are written in from a receiving data RAM of the data storage unit 4.

Figure 15:
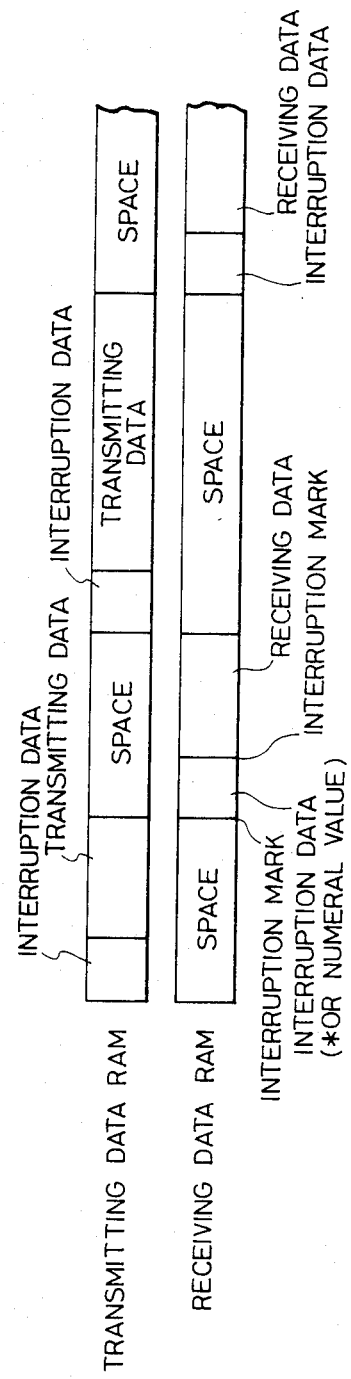
FIG. 15 is compositions of a transmission data RAM and a receiving data RAM.

The constructions of contents of the transmission and the receiving data RAMs are shown in FIG. 15. In FIG. 15, the transmission data, the receiving data and the interruption data are written in by performing the steps S1 to S9 in FIG. 13 and the step S2 in FIG. 14, respectively. As mentioned the interruption data includes the interruption mark, a suitable member of asterisk marks, the interruption timer value and/or "99".

Since in the semi-duplex communication system, there are no simultaneous flows of the transmission data and the receiving data, the receiving data RAM is a space when the transmission data flows and the transmission data RAM is a space when the receiving data flows.

Figure 16:
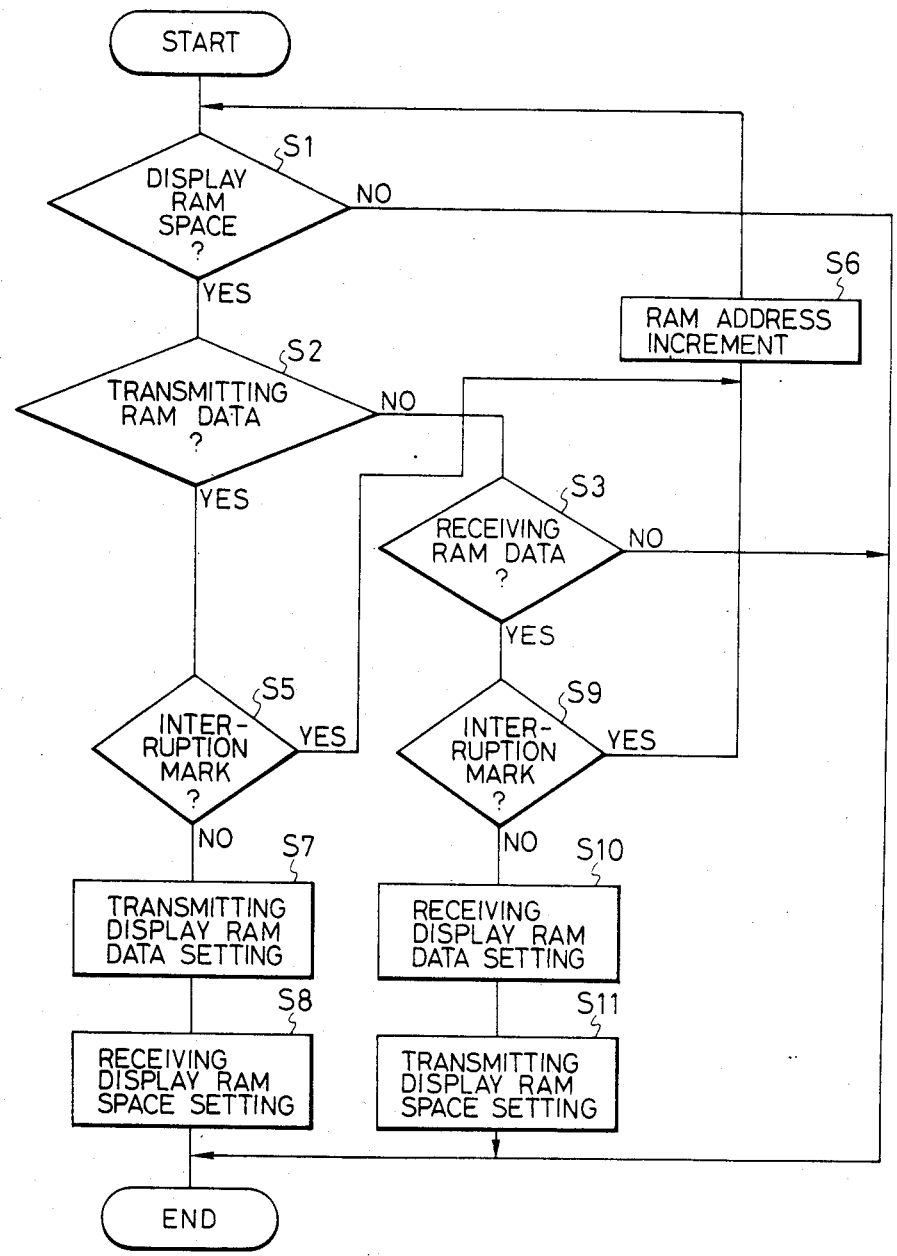
FIG. 16 is a flow-chart showing a process of a display data formation.

When the data are written-in in the transmission data RAM and the receiving data RAM of the data storage unit 4 in this manner, the contents of these RAMs are transferred to a display RAM in which a display data is prepared and supplied to the external display device for display thereon. FIG. 16 is a flow-chart for the preparation of the display data.

In a step S1 in FIG. 16, an existence of space in the display RAM in checked and when there is no space, the operation is terminated. On the other hand, when there is a space, an existence of data in the transmission data RAM is checked in a step S2. When there is no transmission data, an existence of data in the receiving data RAM is checked in a step S3. When no receiving data, the operation is terminated. When there is a data in the transmission data RAM, it is checked in a step S5 to determine whether or not it is an interruption mark. When affirmative, an address of the transmission data RAM is added thereto and a subsequent data reading is performed in a step S6. Since, in this case, the data of the interruption mark in the transmission data RAM is not transferred to the display RAM, there is no display of the interruption mark. When it is decided in the step 55 that it is not the interruption mark, the data in the transmission data RAM is set in the display memory in a step S7 and, then, the space of the receiving data RAM is set in the display RAM in a step S8. In a similar manner, when it is decided in the step S3 that there is a receiving data, the data of the receiving data RAM and a space of the transmission data RAM are set in the display RAM in steps S9 to S11. The data written in the display RAM corresponds to the display.

FIG. 17 is a flow-chart for outputting the data in the display RAM to the external display unit 6, which is performed repeatedly after every display output. In FIG. 17, it is determined in a step S1 whether or not there is a data corresponding to a trigger data set in the data in the display RAM, which is to be sent to the external display unit 6. There is no such data, a data in a transmission buffer of the display RAM is sent to the display unit 6 for display in a step S5 and then a data in a receiving buffer of the display RAm is sent to the display unit 6 for display in a step S6. The transmission buffer and the receiving buffer correspond to the transmission display RAM and the receiving display RAM used in the steps S7, S8, S10 and S11, respectively, and the transmission or receiving buffer is provided in the display RAm correspondingly to every line of the display performed by the external display unit 6. That is, the processing shown by the flow-chart in FIG. 17 is performed for every line.

If in step S1 in FIG. 17, when there is such trigger data, it is decided in a step S2 whether an output of a repeating timer is On or OFF. The repeating timer functions to display the data corresponding to the trigger data glitteringly and an output of an oscillator of the CPU1 which is ON/OFF pulse output being a constant period longer enough than a timer necessary to perform the flowchart in FIG. 17. When the timer output is ON the data corresponding to the trigger data is sided to an area, in a step S3, which may be a portion of the display RAM which is not used at this time and then a space data is set in the position occupied by the data previously in a step S4. Then a display thereof is performed in steps S5 and S6. Thus there is no display of the data corresponding to the trigger data when the timer output is ON. On the other hand, when the timer output is OFF, the data sided is set again in a step S7 and then it is displayed in the steps S5 and S6. Therefore, the data corresponding to the trigger data is displayed. By repeatingly performing the flow-chart in FIG. 17, the data corresponding to the trigger data is displayed on a screen of the external display unit 6 glitteringly in an on-off period corresponding to the output of the repeating timer as shown in FIG. 10.

We claim:

1. A serial transmission line monitoring device for receiving and displaying serial data flowing over a serial transmission line, comprising:
   a receiving means for receiving the serial data;
   a data format setting means for:
      setting a protocol;
      setting a data format; or
      setting an instruction set to be used to control the monitoring of a serial transmission of data;
   a display unit for displaying data for display;
   a memory means for storing data for display or the serial data;
   a central processor unit means for:
      converting the serial data received into data for display by analyzing it according to the protocol or data format;
      setting a break condition in response to format setting performed via said data format setting means;
      setting a display output interruption time in response to format setting performed via said data format setting means;
      testing for the establishment of a break condition occurrence by detecting a coincidence between the received serial data or the data for display obtained by the conversion of the serial data and serial data read from said memory means with said break condition;
      responding to an establishment of a break condition occurrence by interrupting an output of the data for display after the lapse of the display output interruption time; and
      responding to an establishment of a break condition occurrence by interrupting a memorization in said memory means of the serial data or the data for display after the lapse of the display output interruption time.

2. The serial transmission line monitor as claimed in claim 1, wherein:
   said break condition is a trigger data set in at least one of the serial data from a transmission side and a receiving side of said serial transmission line so that said at least one data can be detected by said trigger data; and
   wherein the establishment of a break condition occurs when there is a coincidence between: a. the serial data from the transmission side and the trigger data in the transmission side, and the serial data from the receiving side and the trigger data in the receiving side; or, b. the serial data from either the transmission side or the receiving side and the trigger data in the transmission or receiving side respectively.

3. The serial transmission line monitor as claimed in claim 1, wherein
   said break condition includes trigger data set in serial data from the transmission side and the receiving side of said transmission line so that these serial data are detected by detecting said trigger data; and wherein the establishment of a condition occurs when there is coincidence between: a. the serial data from the receiving side and the trigger data in the receiving side after the serial data from the transmission side coincides with the trigger data in the transmission side; or b. the serial data from the transmission side and the trigger data in the transmission side after the serial data from the receiving side coincides with the trigger data in the receiving side.

4. The serial transmission line monitor device as claimed in any one of claims 1 to 3, wherein said display output interruption time corresponds to a number of time units or a number of data units.

5. The serial transmission line monitoring device as claimed in claim 3, wherein said central processor unit means is further for:
setting an effective data number in response to format setting performed via said data format setting means; and
denying the establishment of a break condition occurrence when: a. the number of effective data in a time period from a coincidence of the serial data from the transmission side with the trigger data in the transmission side to a coincidence of the serial data from the receiving side with the trigger data in the receiving side exceeds the effective data number; or, b. the effective data number in a time period from a coincidence of the serial data from the receiving side with the trigger data in the receiving side to a coincidence of the serial data from the transmission side with the trigger data in the transmission side exceeds the effective data number.

6. The serial transmission line monitoring device as claimed in claim 1 further comprising means for supplying said display data to said display unit and to said external memory device simultaneously in parallel, means for receiving a data reproduced from said external receiving device, and means for supplying said reproduced data or a data obtained by converting said reproduced data.

7. The serial transmission line monitoring device as claimed in claim 1, wherein said central processor unit means is further for:
generating interruption time display data consisting of numbers or symbols, said interruption time display data corresponding to the length of time to the establishment of a break condition occurrence.

8. The serial transmission line monitoring device as claimed in claim 1 wherein said central processor unit is further for:
allowing the selecting between a direct display of the transmission data flowing along the serial transmission line of the semi-duplex system and an indirect display thereof after processed by the protocol of the system, said selecting occurring in response to format setting performed via said data format setting means.

* * * * *